United States Patent
Schmale et al.

(10) Patent No.: US 6,544,470 B1
(45) Date of Patent: Apr. 8, 2003

(54) FEEDING DEVICE FOR ELECTRICAL SHAFT FURNACES WITH AN ELECTRODE-RECEIVING CENTRAL TUBE

(75) Inventors: Klaus Schmale, Krefeld (DE); Andreas Schüring, Mülheim (DE); Guido Grund, Dorsten (DE); Joachim Lemke, Neukirchen-Vluyn (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 09/555,756
(22) PCT Filed: Nov. 12, 1998
(86) PCT No.: PCT/DE98/03420
§ 371 (c)(1), (2), (4) Date: Jul. 5, 2000
(87) PCT Pub. No.: WO99/29914
PCT Pub. Date: Jun. 17, 1999

(30) Foreign Application Priority Data

Dec. 5, 1997 (DE) .......................................... 197 55 890

(51) Int. Cl.[7] .............................................. C21B 7/08
(52) U.S. Cl. ...................................... 266/199; 266/197
(58) Field of Search ................................. 266/197, 199, 266/216, 217

(56) References Cited

U.S. PATENT DOCUMENTS

| | | | | |
|---|---|---|---|---|
| 3,900,117 A | * | 8/1975 | Tuovinen et al. | 222/408 |
| 4,537,551 A | * | 8/1985 | Krogsrud | 414/199 |
| 5,879,617 A | * | 3/1999 | Fuchs et al. | 266/217 |
| 6,221,123 B1 | * | 4/2001 | Mann, Sr. | 266/237 |
| 6,235,075 B1 | * | 5/2001 | Hofmann et al. | 75/10.5 |

* cited by examiner

Primary Examiner—Scott Kastler
(74) Attorney, Agent, or Firm—Cohen, Pontani, Lieberman & Pavane

(57) ABSTRACT

A feeding device for closed shaft furnaces connected to a gas-extracting device, in particular for low shaft furnaces for melting steel scrap, having a transporting device, which leads to the head of the upper furnace vessel and is integrated at least partially in the furnace atmosphere, and a distributing device for distributing the charge. In this case, a carousel which can be charged by a conveying device is provided in the furnace head. The carousel, in the furnace head, is guided rotatably on a path, fastened on the casing of the upper furnace vessel, above the gas-extracting device and has shutter elements connected to actuators.

15 Claims, 4 Drawing Sheets

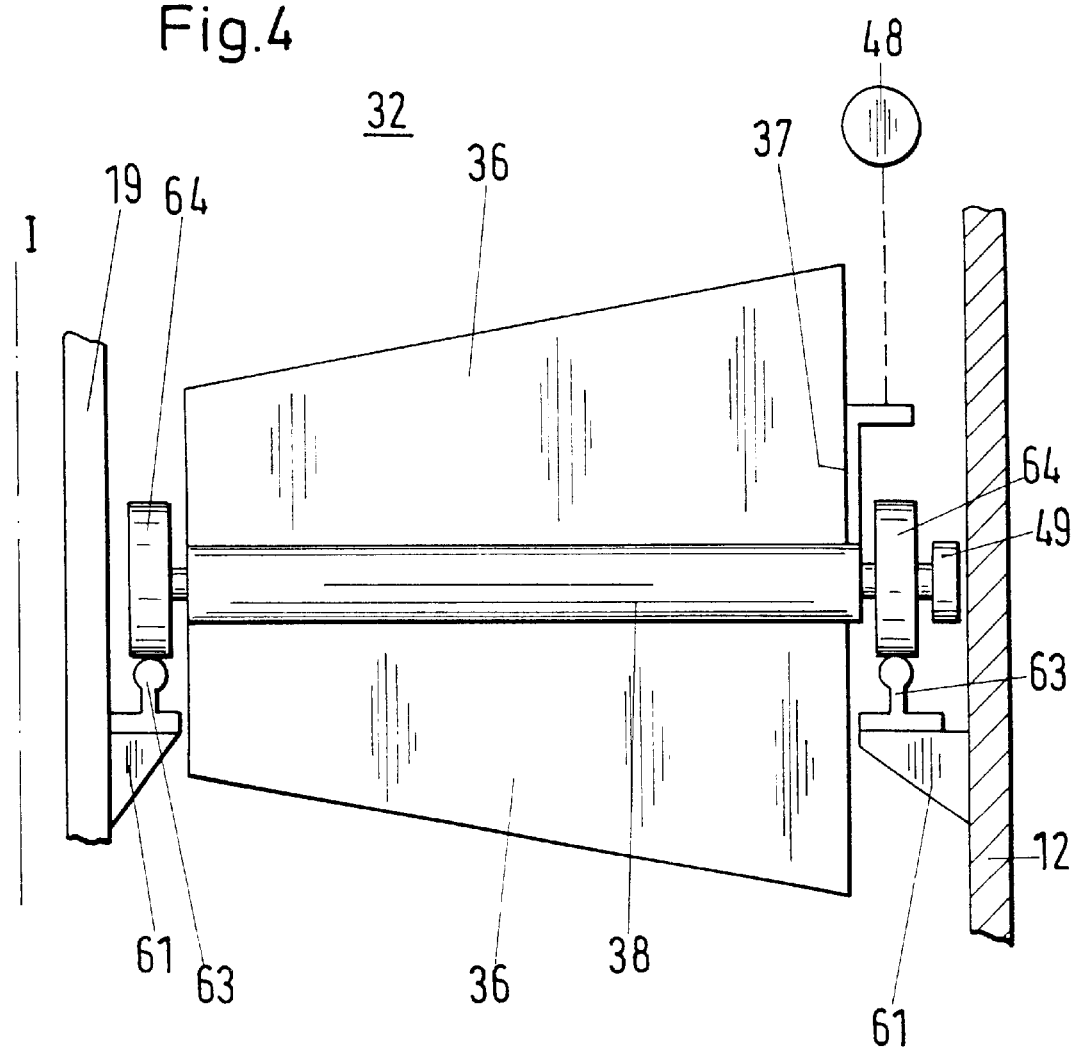

FEEDING DEVICE FOR ELECTRICAL SHAFT FURNACES WITH AN ELECTRODE-RECEIVING CENTRAL TUBE

PRIORITY CLAIM

This is a U.S. national stage of application No. PCT/DE98/03420, filed on Nov. 12, 1998. Priority is claimed on that application and on the following application.

Country: Germany, Application No.: 197 55 890.9, Filed: Dec. 5, 1997.

BACKGROUND OF THE INVENTION

1. Field of the Invention

The invention relates to a feeding device for closed shaft furnaces connected to a gas-extracting device, in particular for low shaft furnaces for melting steel scrap, having a transporting device, which leads to the head of the upper furnace vessel and is integrated at least partially in the furnace atmosphere, and a distributing device for distributing the charge.

2. Discussion of the Prior Art

German Patent 17 58 842 discloses a feeding device which is intended for gas-tight electric furnaces and in the case of which each electrode is assigned feeding tubes above which there is provided a ring which is connected to a rotary drive and to a conveying belt for transporting the charge. In their top part, the feeding tubes are designed as bunkers over which there are provided hoppers which are arranged rotatably via a plurality of running wheels on a ring supported on a circular rail. The ring is closed off in a gas-tight manner by cup seals.

This device, of complex design, only allows the stock level to be charged at certain points in dependence on the number of bunkers.

German Patent 33 14 943 discloses an apparatus for feeding electrothermal smelting furnaces in which annular chambers are arranged concentrically around each electrode, having at least one closable opening leading to the furnace vessel, a concentric inner wall and a concentric outer wall connected thereto. It is possible for the two walls to be rotated relative to the electrode.

This complicated feeding apparatus does not allow the charge to be distributed uniformly in relation to the furnace head as a whole.

Furthermore, German reference DE 44 07 861 C1 discloses a feeding apparatus for closed arc furnaces in which the charge is charged uniformly and concentrically to the annular chamber provided around a concentric main furnace axis. For this purpose, use is made of a traveling mechanism which has switchable lifting magnets.

The disadvantage with this apparatus is the need for an exclusively metallic charge which can be transported by the magnetic conveyor.

SUMMARY OF THE INVENTION

The object of the present invention is to provide a feeding device for closed shaft furnaces which, by straightforward design means, ensures that even a non-metallic charge is supplied reliably to any desired points of the stock level in the furnace.

The invention provides, in the furnace head, a carousel which is constructed from shutter elements and is guided rotatably on a path in the furnace head. The carousel can be charged by a conveying device. One supply point is sufficient for charging the carousel. In this case, the carousel may be charged uniformly or else with predetermined quantities and/or materials.

For charging purposes, the carousel is moved into position and emptied by specific activation of the individual shutter elements.

In this case, the individual shutter elements may be designed as tines which taper in the direction of their tip. In another advantageous configuration, the shutter elements are dimensioned, as segments of a ring, with a width B, where $B=\frac{1}{4}$ to $\frac{1}{16}$ of the circumference of the furnace head, and with a depth c of $c=0.1$ to $1.0 \times R$, where R=radius of the furnace head.

Rotary shutter elements and damping elements are provided for damping the impact when the charge comes into contact with the individual shutters of the carousel. These dampers may be independent elements on which the shutters are supported; however, they may also be parts of the shutter-retaining levers.

For straightforward actuation of the shutter elements, the latter are provided, in the region of the tilting spindle, with levers which are connected to actuators. Proposed actuators are piston/cylinder units or rotary drives.

The carousel according to the invention can be used for any desired shaft furnaces including low shaft furnaces which have electrodes for melting the charge. It is possible for these electrodes to project into the furnace interior without protection or else to be enclosed by a central tube.

In the case of electric arc furnaces with a central tube, it is proposed for the ends of the shutter elements to be supported on supporting elements fastened on the central tube. In an advantageous configuration, these supporting elements may be connected in a form-fitting manner to the shutter elements, for example may be configured as rotary levers. During the operation of charging the carousel, the individual shutters are arrested and released before opening.

According to the invention, the rotary spindle of the shutters may be routed in accordance with the outer ring of the carousel. However; the rotary spindles may also be oriented radially in relation to the main furnace axis. In the latter case, the shutter elements may be configured as double-wing shutters.

Piston/cylinder units or rotary drives are proposed for actuating the shutters. Damping elements are used in each case for absorbing the impact. Use may be made of back-coupling means in this case for the rotary drives. Furthermore, in the case of the rotary drives, the connection to the individual shutters may take place via cable elements.

The individual drives of the shutters are connected to a measuring and regulating device, the latter being connected in control terms to a stock-level measuring means, with the result that the stock level is charged in a manner appropriate for consumption.

BRIEF DESCRIPTION OF THE DRAWING

An example of the invention is given in the attached drawing, in which:

FIG. 4 shows a double-wing shutter.

DETAILED DESCRIPTION OF PREFERRED EMBODIMENTS

Figure 1:
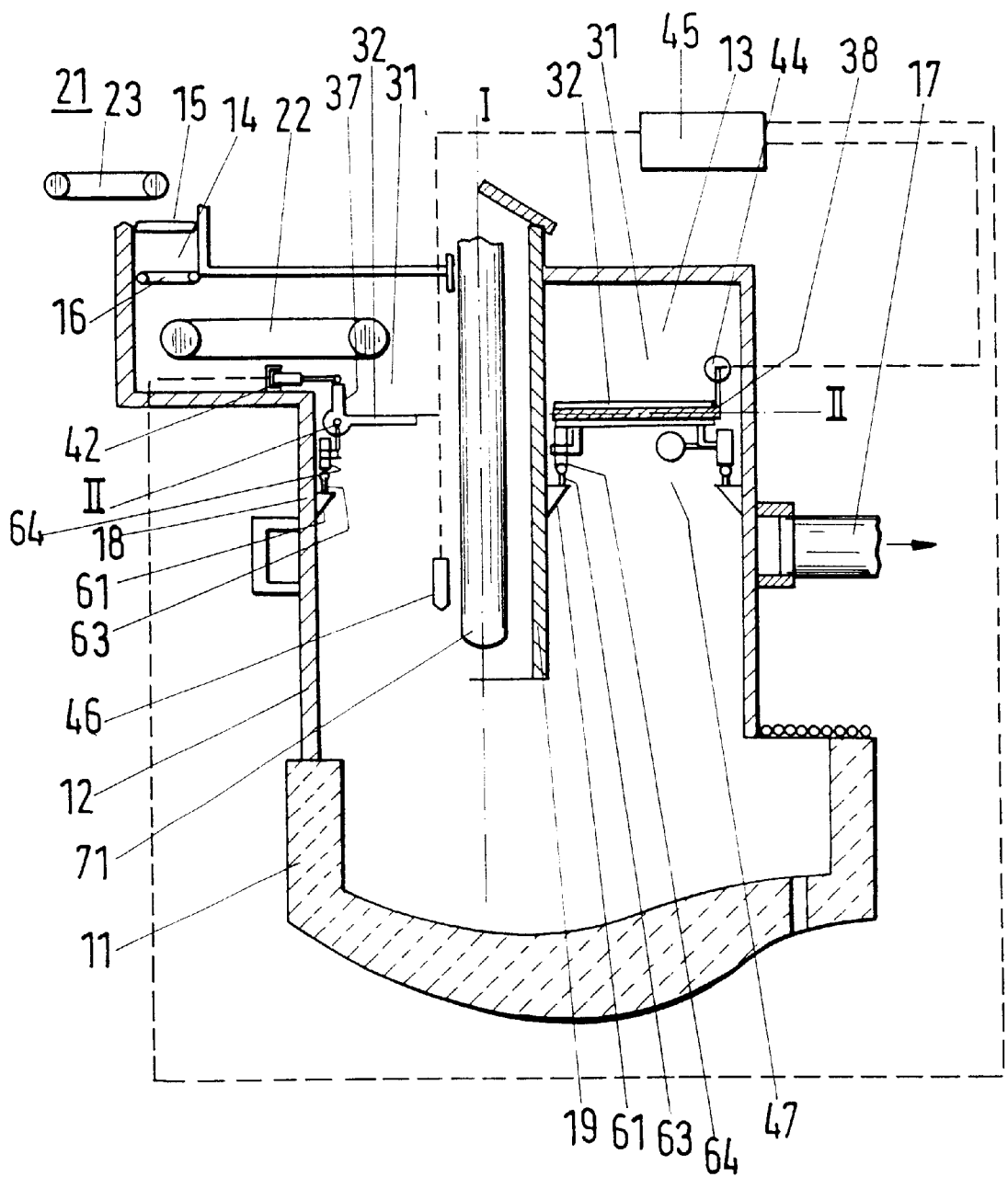
FIG. 1 shows a section through a low shaft furnace.

FIG. 1 shows a lower furnace vessel 11 on which there is positioned an upper furnace vessel 12 which is charged in the furnace head 13 by a conveying device 21, in this case comprising an inner conveying belt 22 and an endless supply belt 23. Arranged between the supply belt 23 and the conveying belt 22 is a material lock 14 which has an outer shutter 15 and an inner shutter 16.

The conveying device 21 may be configured—not illustrated specifically in FIG. 1—as desired, for example as a cage or as a chute or the like.

In the present form, the charge is conveyed to a carousel 31 via the inner conveying belt 22.

In the left-hand part of FIG. 1, the electrode 17 projects into the upper furnace vessel 12 without protection. A stock-level measuring means 46 is also illustrated schematically.

The carousel 31 illustrated above the gas-extraction device 17 in the left-hand part of FIG. 1 has shutter elements 32 which can be rotated about the tilting spindle II and have levers 37 which are connected to a piston/cylinder unit 42. The shutter elements 32 are mounted rotatably via wheels 64 on rails 63.

In the right-hand part of FIG. 1, the electrode 71 is enclosed by central tube 19. Provided on the central tube 19 are supporting elements 61 on which there are fastened the rails 63 over which the wheels 64 run. The same wheel/rail system is provided on the casing 18 of the upper furnace vessel 12. The wheels 64 are connected to shafts 38 which are oriented radially in relation to the furnace axis I and on which there are arranged shutter elements 32 which are configured as double-wing shutters 36, which can be rotated via rotary drives 44.

The rotary drive 44 and the piston/cylinder unit 42 are connected to measuring and regulating device 45, to which the stock-level measuring means 46 is connected in control terms.

Also provided is a traveling mechanism 49 by means of which the carousel 31 can be rotated. In addition to the wheel/rail drives illustrated here, it is also possible to use other drives, for example a magnet levitation drive or a sliding bearing.

Figure 2:
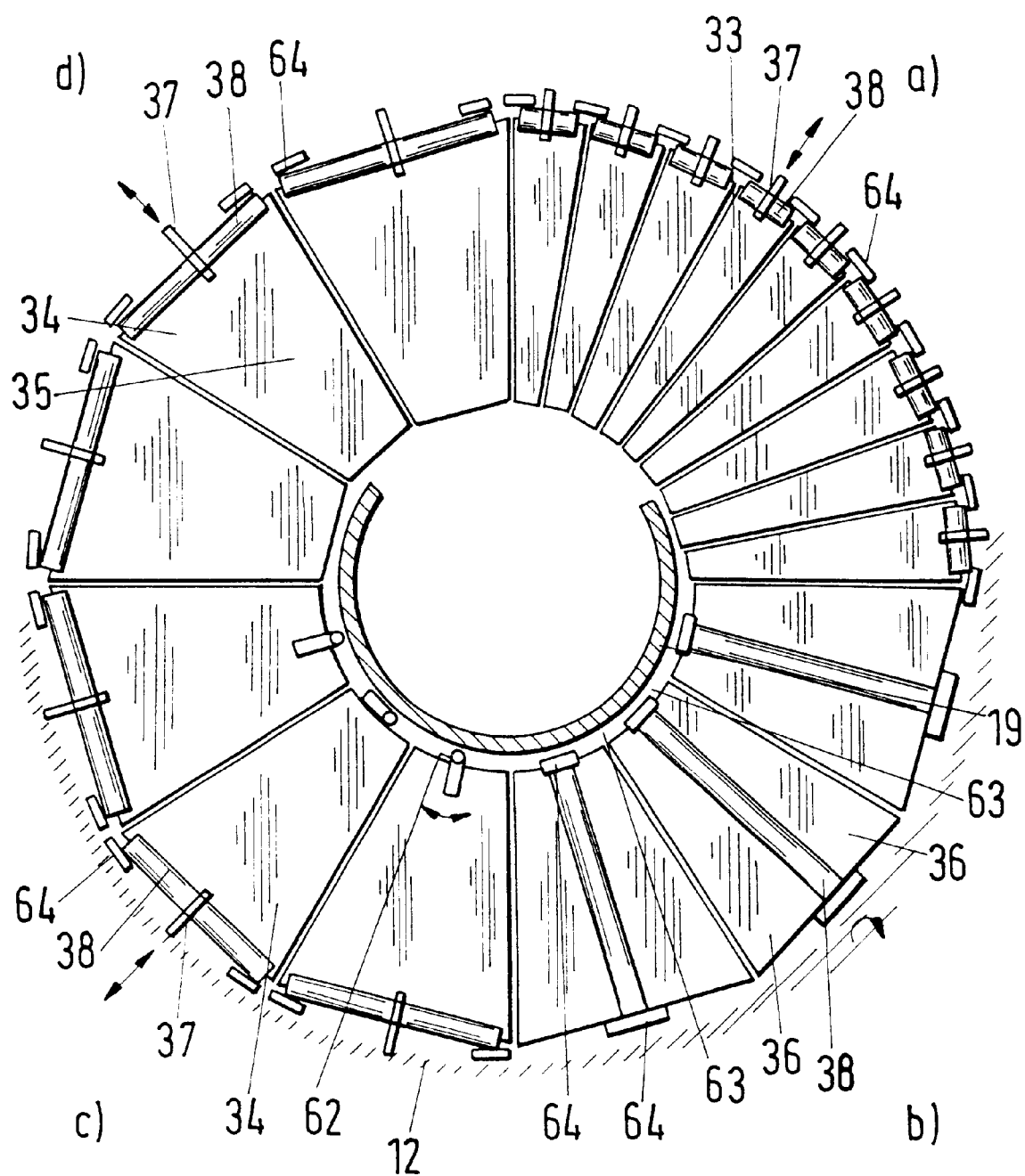
FIG. 2 shows a plan view of the carousel.

FIG. 2 shows a plan view of a carousel, to be precise in four quadrants a–d of basically different types of construction.

The quadrant a) shows tines 33 with levers 37. These tines 33 can be used for a furnace with or without a central tube 19.

The quadrant b) shows shutter elements 32 with double-wing shutters 36 and shafts 38 oriented radially in relation to the furnace center. Wheels 64 are provided at the shaft ends 38.

The quadrant c) shows shutter elements 32 as ring segments 34 in the case of which levers 37 rotate the shutter elements 32 about a shaft 38. The ring segments 34 are retained by rotary levers 62, fastened on the central tube 19, and can be arrested by these.

Provided in the quadrant d) are ring segments 34 on which there are fastened levers 37 which rotate the segments 34 about the shaft 38.

The ring segments 34 can be used for a shaft furnace with or without a central tube 19.

Figure 3:
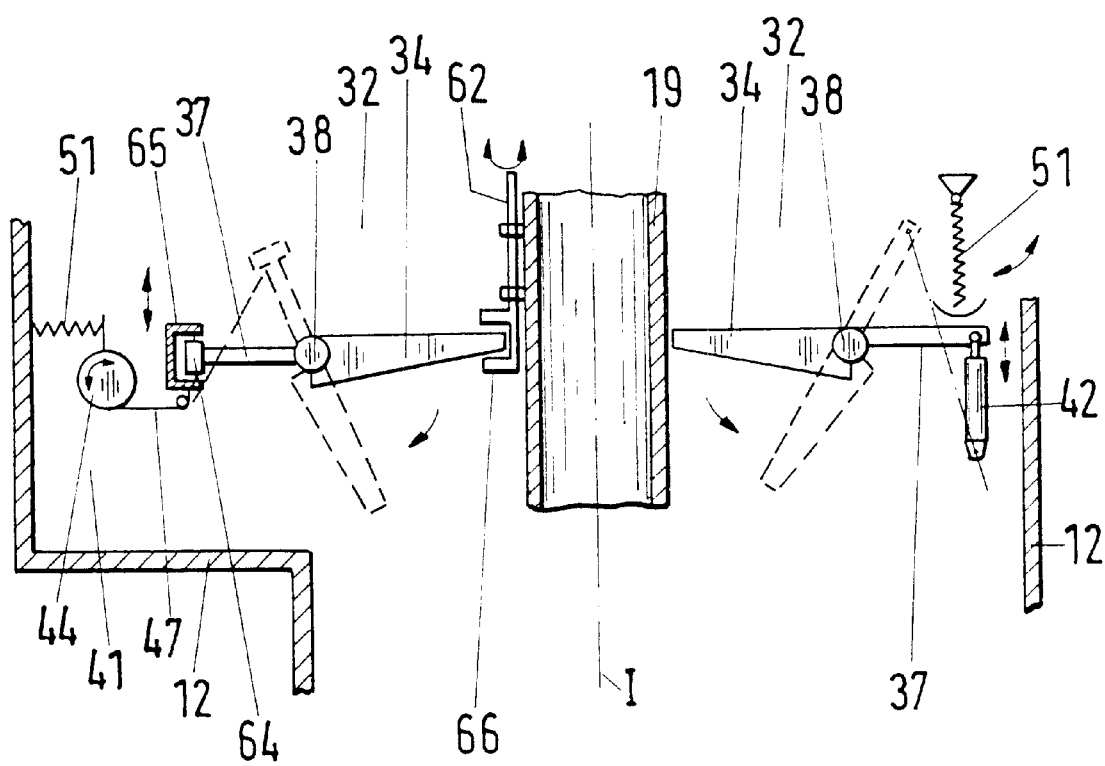
FIG. 3 shows a single-wing shutter.

FIG. 3 shows shutter elements 32 which are configured as single-wing shutters and are arranged in the upper furnace vessel 12, the central tube 19 being routed concentrically therewith.

On the right-hand side, a ring segment 34 can be rotated about a shaft 38. Fastened on the ring segment 34 is a lever 37 which, via a piston/cylinder unit 42, retains the shutter element 32 in its retaining position and/or swings it round for the introduction of the charge.

In order to absorb impact to which the shutter element 32 is subjected by the charge during the filling operation, a damping element 51 is provided, this damping element, in the present case, being of pivotable configuration and, at the same time, arresting the shutter in the closed position.

On the left-hand side, the actuator 41 provided is a rotary drive 44 which is connected to the shutter element 32 via a cable 47.

Fastened on the ring segment 34 which is illustrated here, and can be tilted about the shaft 38, is a lever 37 at the head end of which there is provided a wheel 64 which is guided in a wheel-guiding segment 65. The wheel-guiding segment 65 can be displaced so as to release the wheel 64 and thus the shutter element 32 as a whole.

Provided on the central tube 19 are rotary levers 62 which have gripping elements 66 by means of which the ring segments 34 can be gripped at the head end. By virtue of the rotary levers 62 being rotated, the ring segment 34 is released at the head end for swinging-open purposes.

In the case of the shutters illustrated in FIG. 3, the charge is conveyed into the furnace such that it collects predominantly in the vicinity of the central tube 19. This effect is desired in certain operating modes of the furnace.

In FIG. 4, the shutter element 32 is configured as a double-wing shutter 36. The shaft 38 is provided in the shutter center and has wheels 64 at both ends. The wheels 64 are guided over rails 63 which are fastened on supporting elements 61 on the upper furnace vessel 12 and on the central tube 19.

Fastened on the shaft 38 is a lever 37 which is connected to a swing-action drive 48. The swing-action drive 48 may be configured as a piston/cylinder unit 42 or as a rotary drive 44.

Without further details being given, the shutter element 32 is connected to a traveling mechanism 49.

The invention is not limited by the embodiments described above which are presented as examples only but can be modified in various ways within the scope of protection defined by appended patent claims.

What is claimed is:

1. A feeding device for a closed shaft furnace connected to a gas-extracting device, the furnace having an upper vessel with a head and a casing, comprising: a transporting device which leads to the head of the upper furnace vessel and is integrated at least partially in a furnace atmosphere; and a distributing device for distributing a charge and including a carousel provided in the furnace head so as to be chargeable by a conveying device, and a path fastened on the casing of the upper furnace vessel above the gas-extracting device, the carousel in the furnace head being guided rotatably on the path, the carousel having shutter elements connected to actuators.

2. A feeding device as defined in claim 1, wherein the shutter elements are segments of a ring with a depth (c), where c=0.1 to 1.0×R, where R=radius of the furnace head, and with a width B=¼ to ¹⁄₁₆×U, where U=circumference of the furnace head.

3. A feeding device as defined in claim 1, wherein the shutter elements are tines which taper conically to a tip.

4. A feeding device as defined in claim 1, wherein levers are provided on the shutter elements in a region of a tilting spindle of the shutter elements, the levers being connectable to the actuators.

5. A feeding device as defined in claim 1, wherein the actuators are drivers having a piston/cylinder unit.

6. A feeding device as defined in claim 1, wherein the actuators are rotary drives.

7. A feeding device as defined in claim 6, and further comprising cables arranged to connect the rotary drives to the shutter elements.

8. A feeding device as defined in claim 1, and further comprising damping elements arranged on the shutter elements so as to damp impact of the charge coming into contact with the shutter elements in a closed position of the shutter elements.

9. A feeding device as defined in claim 1, wherein the shaft furnace has a central tube which is arranged coaxially with the cylindrical upper furnace vessel and is intended for guiding material and for receiving electrodes, the feeding device further comprising supporting elements fastened on the central tube, ends of the shutter elements being supported on the supporting elements.

10. A feeding device as defined in claim 9, wherein the supporting elements are connected in a form-fitting manner to the shutter elements.

11. A feeding device as defined in claim 10, wherein the supporting elements are rotary levers.

12. A feeding device as defined in claim 9, wherein the shutter elements have rotary spindles which are arranged so that they are rotatable about shafts and are oriented concentrically with the furnace axis, the shutter elements being configured as double-wing shutters which are supported, in a region of the rotary spindle, on supporting elements arranged on an inner wall of the upper furnace vessel and an outer wall of the central tube.

13. A feeding device as defined in claim 12, wherein the supporting elements are rails, wheels being connected to the rotary spindles of the shutter elements so as to roll on the rails.

14. A feeding device as defined in claim 5, and further comprising a measuring and regulating device operatively connected to the drives so that each individual shutter can be actuated.

15. A feeding device as defined in claim 14, and further comprising means for measuring stock level in the furnace, said measuring and regulating device being connected in control terms to the stock-level measuring means.

* * * * *